United States Patent
Krovi

(10) Patent No.: US 10,185,916 B2
(45) Date of Patent: Jan. 22, 2019

(54) QUANTUM CIRCUIT FOR HIGH DIMENSIONAL SCHUR TRANSFORM

(71) Applicant: RAYTHEON BBN TECHNOLOGIES CORP., Cambridge, MA (US)

(72) Inventor: Hari K. Krovi, Lexington, MA (US)

(73) Assignee: RAYTHEON BBN TECHNOLOGIES CORP., Cambridge, MA (US)

(*) Notice: Subject to any disclaimer, the term of this patent is extended or adjusted under 35 U.S.C. 154(b) by 0 days.

(21) Appl. No.: 15/587,333

(22) Filed: May 4, 2017

(65) Prior Publication Data

US 2017/0357907 A1    Dec. 14, 2017

Related U.S. Application Data

(60) Provisional application No. 62/348,109, filed on Jun. 9, 2016.

(51) Int. Cl.
   *G06N 99/00*    (2010.01)
(52) U.S. Cl.
   CPC ................. *G06N 99/002* (2013.01)
(58) Field of Classification Search
   CPC .................................................. G06N 99/002
   USPC ......................................................... 708/403
   See application file for complete search history.

(56) References Cited

U.S. PATENT DOCUMENTS

| | | | |
|---|---|---|---|
| 8,245,165 B1* | 8/2012 | Tiwary | G06F 17/5031 716/108 |
| 2006/0224547 A1* | 10/2006 | Ulyanov | B82Y 10/00 706/62 |
| 2016/0110311 A1* | 4/2016 | Tucci | G06N 99/002 712/42 |

OTHER PUBLICATIONS

Hari Krovi, "An efficient high dimensional quantum Schur transform", Apr. 3, 2018, export.arxiv.org/pdf/1804.00055.*
Bacon, D., Chuang, I. L., and Harrow, A. W. (Oct. 27, 2006). "Efficient Quantum Circuits for Schur and Clebsch-Gordan Transforms." Physical Review Letters, vol. 97, Issue 170502, pp. 170502-1-170502-3 (4pp.); The American Physical Society, U.S.

* cited by examiner

*Primary Examiner* — Tan V Mai
(74) *Attorney, Agent, or Firm* — Lewis Roca Rothgerber Christie LLP

(57) ABSTRACT

A quantum circuit and method for Schur transform includes: a first quantum register including n quantum systems initialized to an initial state of "0", where n is an integer and represents a number of quantum systems; a second quantum register including m quantum systems initialized to the initial state of "0", where m is an integer and represents a required workspace; a first quantum circuit that operates on only the first register and performs a block diagonalization of the n quantum systems into permutation modules; a second quantum circuit that operates on both registers and block diagonalizes each of the permutation modules using a QFTPermMod operation; and one or more quantum output registers coupled to the second quantum circuit for holding a basis for the Schur transform.

10 Claims, 3 Drawing Sheets

QUANTUM CIRCUIT FOR HIGH DIMENSIONAL SCHUR TRANSFORM

CROSS-REFERENCE TO RELATED APPLICATION(S)

This patent application claims the benefits of U.S. Provisional Patent Application Ser. No. 62/348,109, filed on Jun. 9, 2016 and entitled "Efficient Schur Transform," the entire content of which is hereby expressly incorporated by reference.

FIELD OF THE INVENTION

The disclosed invention generally relates to quantum processing and more particularly to a quantum circuit for high dimensional Schur transform.

BACKGROUND

Schur transform is a unitary operator that block diagonalizes the action of the symmetric and unitary groups on a tensor product $V^{\otimes n}$ of a vector space V of dimension d with itself n times. In other words, Schur transform changes the basis from a computational to diagonal basis, which is a preferred basis for many problems. In mathematics, an unitary group of degree n, denoted U(n), is the group of n×n unitary matrices, with the group operation of matrix multiplication. In quantum mechanical computations, matrix diagonalization is one of the most frequently applied numerical processes. The basic reason is that the time-independent Schrödinger equation is an eigenvalue equation, albeit in most of the physical situations on an infinite dimensional space. A very common approximation is to truncate the infinite space to finite dimension, after which the Schrödinger equation can be formulated as an eigenvalue problem of a real symmetric, or complex Hermitian, matrix.

In a simplified way, Schur transform describes a unitary operation that converts a standard initial state to a "Schur basis," from which (quantum) information can be easily extracted (measured). Generally, a set of quantum states, for example, in a high dimensional system include a substantial level of symmetry/redundancy, which are interchangeable without changing the high level system. Schur basis removes this symmetry/redundancy resulting in a more simplified system. Schur transform includes two group types associated with the symmetry/redundancy: an Unitary Group, and a Symmetric Group. Conventional methods use the Unitary Group to obtain the Schur basis. However, these methods become highly complex and impractical for high dimensional systems.

There are two versions of Schur transform, a weak transform and a strong transform. The week version performs a partial change of basis, whereas the strong version performs a full change of basis, depending on the problem and its requirements. Typically, there are three parameters involved with a Schur transform, d (qubit dimension), n (number of copies) and e (error). There exist weak transforms that are adequately efficient for all the three parameters. However, there is no strong transform that is efficient for all the three parameters.

Dave Bacon, Isaac L. Chuang and Aram W. Harrow, "Efficient quantum circuits for Schur and clebsch-gordan transforms," Proceedings of the Eighteenth Annual ACM-SIAM Symposium on Discrete Algorithms, SODA '07, pages 1235-1244, Philadelphia, Pa., USA, 2007. Society for Industrial and Applied Mathematics. ISBN 978-0-898716-24-5 ("BCH"), the entire contents of which is hereby expressly incorporated by reference, using the Unitary Group, provided a quantum process for this transform that is polynomial in n, d and $\log \varepsilon^{-1}$, where $\varepsilon$ is the precision of the transform.

SUMMARY

In some embodiments, the disclosed invention is a quantum circuit for Schur transform. The quantum circuit includes: a first quantum register including n quantum systems initialized to an initial state of "0", where n is an integer and represents a number of quantum systems; a second quantum register including m quantum systems initialized to the initial state of "0", where m is an integer and represents a required workspace; a first quantum circuit that operates on only the first register and performs a block diagonalization of the n quantum systems into permutation modules; a second quantum circuit that operates on both registers and block diagonalizes each of the permutation modules using a QFTPermMod operation; and one or more quantum output registers coupled to the second quantum circuit for holding a basis for the Schur transform.

In some embodiments, the disclosed invention is a quantum method for performing Schur transform. The method includes: providing a first quantum register including n quantum systems initialized to an initial state of "0", where n is an integer and represents a number of quantum systems; providing a second quantum register including m quantum systems initialized to the initial state of "0", where m is an integer and represents a required workspace; performing a block diagonalization on the first register into permutation modules; performing block diagonalizing on each of the permutation modules using a QFTPermMod operation; and holding outputs of the block diagonalization of each of the permutation modules as a basis for the Schur transform.

In some embodiments, m is equal to n. In some embodiments, the QFTPermMod operation comprises: providing a first quantum register including a computational basis given by elements of the transversal of $G_0$ in $S_n$, where $G_0$ is a Young subgroup, and $S_n$ is a subgroup tower; providing a second quantum register that is an ancilla register of log $|G_0|$ qubits and is initialized to $|0>$; performing an inverse quantum Fourier Transform ($QFT^{-1}(G_0)$) on the second quantum register; performing a generalized phase estimation ($GPE_R$) on the inverse $QFT^{-1}(G_0)$ of the second quantum register and the first register, where R is the right regular representation of $S_n$; and performing a quantum Fourier Transform ($QFT(S_n)$) on the first and second quantum registers.

BRIEF DESCRIPTION OF THE DRAWINGS

These and other features, aspects, and advantages of the disclosed invention will become better understood with regard to the following description, appended claims, and accompanying drawings.

DETAILED DESCRIPTION

Figure 1:
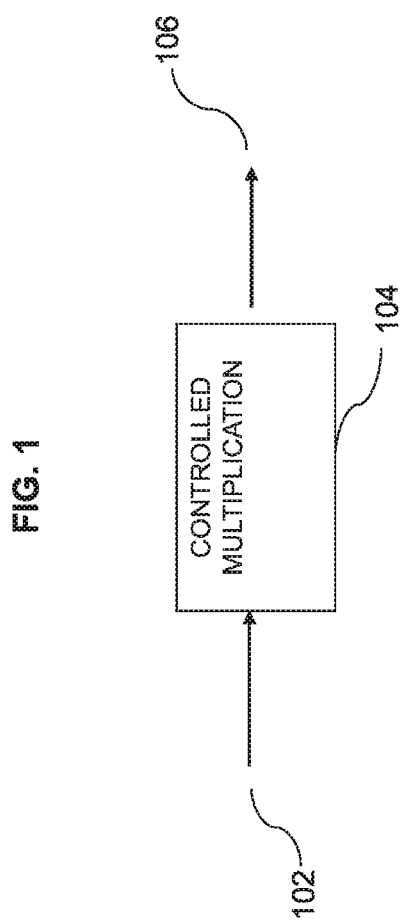
FIG. 1 is an exemplary quantum circuit for performing a generalized phase estimation (GPE), according to some embodiments of the present invention.

According to some aspect of the disclosed invention, a Schur-Weyl duality is used to construct a transform that is efficient for all the three parameters.

Schur-Weyl duality has numerous applications in quantum information theory. It has been used to prove that the tensor product of many copies of a density operator is close to a projector. In fact, the projector is the one corresponding to a partition in Schur-Weyl duality that is closest to the spectrum of ρ. It has also been used to prove de Finetti theorems, which have many applications in security proofs of quantum key distribution (QKD) systems. It has also been applied to universal distortion-free entanglement concentration, universal compression, and encoding and decoding into decoherence-free subspaces. A quantum circuit can also be used for spectrum testing of a density operator and for sample-optimal state tomography.

In some embodiments, the disclosed invention is a quantum circuit that processes a quantum process for the Schur transform that is polynomial in n, log d and log $\varepsilon^{-1}$, that is, all the three parameters of a Schur transform. The quantum circuit and the quantum process build this transform using the representation theory of the symmetric group. This is in contrast to the previous approaches, which exclusively use the representation theory of the unitary group. In this sense, the process according to the disclosed invention can be considered as a "dual" process. In some embodiments, this dual Schur transform is essentially a block diagonalization of induced representations.

A representation of a finite group on a finite dimensional vector space V is a homomorphism from the group G to the unitary group on the vector space U(V), i.e., a representation is ρ: G→U(V). For every finite group, any representation on V can be made unitary i.e., ρ (g) is a unitary matrix for all g in G. Very often, the space which the representation ρ maps to, is identified with the representation.

In an induced representation, given a subgroup H of G and a representation (ρ, W) of H, one can construct a representation V of G as follows. As a vector space, it is the tensor product C[G/H] Tensor W, where C[G/H] is the space of cosets of H in G. The action of G on this basis can be described using a transversal G/H={$t_1, t_2, \ldots t_m$} for H in G, where m is the number of cosets, i.e., m=|G|/|H|. This means that these elements form an orthonormal basis of the vector space C[G/H]. Let {|$w_1$⟩|$w_d$⟩} be a basis of W. The induced representation can be denoted by $\uparrow H^G$ ρ or $\uparrow^G$ ρ (when H can be inferred). In this basis, $\uparrow H^G$ ρ (g) is the following action on basis vectors (which can be linearly extended to other vectors).

$$\left(\uparrow_H^G \rho\right)(g):|t\rangle \otimes |w_i\rangle \mapsto |t'\rangle \otimes \rho(h)|w_i\rangle \quad (1)$$

where t' ∈ G/H and h ∈ H are the unique elements for which gt=t'h.

As explained above, Schur-Weyl duality refers to the fact that the actions of the symmetric group and the unitary group on $V^{\otimes n}$ are full centralizers of each other. In terms of representations, this can be written as follows. Suppose we pick the representation of the symmetric group on $V^{\otimes n}$ and block diagonalizable it to obtain irreps as follows $$V^{\otimes n} \cong \bigoplus_\lambda W_\lambda \otimes V_\lambda \quad (2)$$

where λ runs over all the irreps of the symmetric group, $V_\lambda$ is the irrep space of the irrep λ and $W_\lambda$ is the multiplicity space on which the symmetric group acts trivially. Now consider the following action of the unitary group: $U^{tensor\ n}$ i.e., the diagonal action where the same unitary acts on each copy of the vector space V. This action clearly commutes with the action of the symmetric group. This means that in terms of representations, $W_\lambda$ is a representation of the unitary group for each λ. Schur-Weyl duality essentially asserts that $W_\lambda$ is not just a representation, but rather an irreducible representation of the unitary group. Stated in yet another way, the same unitary transformation that block diagonalizes the symmetric group representation into irreps also block diagonalizes the unitary group representation into irreps. In order to write this in terms of a basis, let us first pick a basis for V as {|1⟩, . . . |d⟩}. Then a basis for $V^{\otimes n}$ is the set {|$i_1$, . . . , $i_n$⟩}, where $i_k$ is a member of [d]. The basis after block diagonalization can be written as |λ, i, j⟩, where λ labels the symmetric (or unitary) group irrep, i is an index for a basis of the unitary group irrep and j indexes the symmetric group irrep basis. In terms of this, the (strong) Schur transform can be defined as the unitary transformation that changes the basis from the computational one, i.e., |$i_1$, . . . , $i_n$⟩, to the block diagonal one |λ, i, j⟩.

An alternative way of representing the basis vectors of the unitary group is the so called Gelfand-Tsetlin (GT) patterns. GT patterns are useful in certain applications, although one can easily convert an SSYT to a GT pattern and vice versa. A GT pattern M is a triangle of numbers. The label i of the unitary group irrep is essentially a GT pattern or equivalently a SSYT and the label j is a SYT since it corresponds to the Young-Yamanouchi basis element of the symmetric group. A Young tableau is a Young diagram with numbers in the boxes. If the numbers are from 1 to n, increasing from left to right and top to bottom, then the Young tableau is called a standard Young tableau (SYT). The GT basis of the unitary group irrep λ, consists of a highest weight given by ($\lambda_1, \ldots \lambda_d$) and the highest weight vector is represented by the SSYT of shape λ and content is also λ, i.e., its first row contains all ones, second row is all twos etc. In fact, the weight of any basis vector is the content of the SSYT. A Young diagram where the rows are weakly increasing, i.e., the numbers either increase or stay the same as moved to the right and the columns are strictly increasing is called a semi-standard Young diagram (SSYT). Therefore, all the basis vectors corresponding to SSYTs of a fixed content μ are degenerate and the multiplicity of this weight space is $K_{\lambda,\mu}$. The correspondence between the Kostka number $K_{\lambda,\mu}$ and the multiplicity of the weight space with content μ can be shown combinatorially.

The usual Fourier transform is a unitary operator, which changes the basis from the basis of group elements {|g⟩|g in G} to the block diagonal form given above. This transform is now used to construct a Fourier transform for induced representations, i.e., a transform that block diagonalizes induced representations. It turns out that the Fourier transform for induced representations allows us to construct the dual Schur transform.

Suppose we have an induced representation from H to G of an irreducible representation α of H, i.e., we have $\uparrow H^G$ σ. The computational basis for this space can be written as |t,v⟩, where t is an element of the transversal and v is a basis vector in the representation space of σ. This induced representation is in general reducible as a representation of G and can be decomposed as a sum of irreducible representations. The multiplicity of each irreducible representation ρ in the decomposition is equal to, using Frobenius reciprocity, the multiplicity of α in the restriction of ρ to H. We now describe how one can perform this transform.

The change of basis from the basis labeled |t,v⟩ to a block diagonal basis labeled, say |λ, i, j⟩ is to be implemented.

Here λ labels the irreps that appear in the decomposition and i and j are the multiplicity and the irrep space basis vectors.

1. Append an ancilla register of size $|H|/\dim(\sigma)$ (which is an integer) to the initial state so that we have a register of size H (excluding the transversal register). We now embed $|v\rangle$ into this register of size H as $|\sigma, u, v\rangle$, where u labels the multiplicity space of dimension $\dim(\sigma)$.

2. Next, perform the inverse quantum Fourier transform (QFT) over H to get the group basis $|h\rangle$. Therefore, including the transversal register, we have $|t, h\rangle$. Now, write this as $|g\rangle$. For the symmetric group, it turns out that this is trivial since both t and h are specified as transpositions.

3. Now perform the QFT over G to obtain the basis $|\lambda, i, j\rangle$. The label i is the multiplicity index, which runs over the entire dimension of λ. However, for an induced representation, it would run over a smaller set in general. Similarly, for the irrep label, if the irrep and the multiplicity index labels can be ordered in such a way that the ones that occur in the decomposition are higher in the ordering, then we can easily return the ancilla register and obtain a clean transform. For the goal of block diagonalization, this ordering is not so important. However, this can be done for the case of the symmetric group.

Quantum Fourier transform (QFT) may be performed over permutation modules in order to perform the above mentioned block diagonalization, which is a step to get to the Schur basis. First, we briefly explain Beals' process for a quantum Fourier transform over $C(S\_n)$ and the labeling of the Fourier basis used in it. The process proceeds by reducing each element of the symmetric group into a product of adjacent transpositions. The set of adjacent transpositions $\{(12), (23), \ldots, (n-1n)\}$ generate the group and hence any element can be written as a product of adjacent transpositions. Beals' process uses subgroup adapted bases, a technique that has been generalized to several other groups. By inductively constructing the Fourier transform on the subgroup tower $\{S_n, S_{n-1}, \ldots, S_1\}$, the process converts from the group basis $|g\rangle$ to the basis $\lambda, i, j$. The indices i and j label the multiplicity space and irrep space, which are of the same dimension since this is the regular representation. Therefore, they are both labeled by SYTs defined above. They can also be labeled by paths in the Bratelli diagram, which is a rooted tree with nodes at each level n corresponding to all the inequivalent irreps of $S_n$. In this tree, there are edges between a node or irrep at level n (say ρ) and a node or irrep at level n−1 (say σ) if σ is contained in the restriction of ρ to $S_{n-1}$. The multiplicity of this edge is equal to the multiplicity of σ in ρ. We use this process as a routine below. We denote a QFT over $S_n$ as QFT$(S_n)$ in the following and a QFT over any Young subgroup $G_0$ by QFT$(G_0)$.

As explained above, permutation modules are induced representations from the trivial representation of some Young subgroup $G_0$ to $S_n$. The Young subgroup $G_0$ can be regarded as the stabilizer group of some n tuple $E=(e_1, \ldots, e_n)$ with entries $e_i$ in [d]. This representation space is spanned by all possible permutations of E. In order to construct the Fourier transform over this space, we first re-write these vectors in a way that reflects the structure of the induced representation. In other words, we choose a transversal and think of elements of the transversal $|t\rangle$ as basis vectors. Now, we can use this process to construct Fourier transforms over induced representations.

1. Take an ancilla of size $|G_0|$ (more precisely, $\log |G_0|$ qubits) with all the qubits in the state $|0\rangle$.

2. Then, perform the inverse Fourier transform over $G_0$ to obtain the equal superposition over all the elements of $G_0$.

This can now be thought of as a subspace of $C(S_n)$ spanned by equal superposition over elements of cosets of $G_0$ in $S_n$.

3. On this space, perform the quantum Fourier transform over $S_n$. This produces the basis $|\lambda, i, j\rangle$ with i and j labeled by SYTs.

The set of irreps λ that appear in the decomposition are the ones that dominate the Young diagram corresponding to $G_0$. Similarly, the multiplicity space, although embedded inside a space of dimension $d_\lambda$, does not have support on all the vectors. It will be supported only on $K_{\lambda,\mu}$ many vectors. This space is the multiplicity of the trivial representation of the subgroup $G_0$ when λ is restricted to $G_0$.

While the process above does an essential block diagonalization, in some embodiments, the multiplicity index label basis vectors of the right subspace is used rather than have it label the basis of a larger space. In order to do this, the basis inside multiplicity spaces is changed to correspond to the trivial space under the action of the subgroup $G_0$. This follows from Frobenius reciprocity as mentioned earlier, to get to the Gelfand-Tsetlin basis in the dual Schur transform. To perform this base change in the multiplicity spaces, a generalized phase estimation (GPE) may be used. In this technique, one can block diagonalize any representation ρ if one can perform ρ(g) with g as control. The GPE is used to organize the multiplicity space into a basis that consists of vectors that transform trivially under $G_0$. This $G_0$ can be used to re-organize the multiplicity space. In order to have a controlled application inside the multiplicity space, we can first have a controlled right multiplication and then apply the quantum Fourier transform. GPE can be combined with the process described above to get a decomposition of the multiplicity space. A more detailed process for GPE and its performance guarantee are as follows.

Inputs: A quantum state $|\psi\rangle$ in the representation space ρ of a group G.

Module: Procedure to perform controlled multiplication in the presentation ρ

Outputs: The outcome λ of an irrep of G with probability $p_\lambda = \langle \psi | \Pi_\lambda | \psi \rangle$.

Runtime: $2T_{QFT(G)} + T_{C\rho}$, where $T_{QFT(G)}$ is the time to perform a QFT over the group G and $T_{C\rho}$ is the time to perform controlled multiplication in the presentation ρ.

1. Take an ancilla register of log $|G|$ qubits initialized to $|0\rangle$.

2. Perform inverse QFT$^{-1}$(G) on it.

3. Perform $C\rho = \Sigma_g |g\rangle\langle g| \otimes \rho(g)$.

4. Perform a QFT(G) to the ancilla register.

5. Measure the irrep label of the ancilla register.

The module in the above procedure can be made explicit in the following process. The representation ρ turns out to be the usual right regular representation and can be efficiently implemented. The overall process to block diagonalize permutation modules is the following. This process is potentially applicable to other problems where one needs to block diagonalize induced representations.

FIG. 1 is an exemplary quantum circuit for performing a generalized phase estimation (GPE), according to some embodiments of the present invention. As shown, a quantum register representing a quantum state $|\psi\rangle$ 102 in the representation space ρ of a group G is input to a controlled multiplication quantum circuit 104 for perform controlled multiplication in the presentation ρ, as explained above. The controlled multiplication quantum circuit 104 generates the outcome λ 106 of an irrep of G with probability $p_\lambda = \langle \psi | \Pi_\lambda | \psi \rangle$.

QFTPermMod($G_0$)

Inputs: A quantum register A with the computational basis given by elements of the transversal of $G_0$ in $S_n$.

Outputs: Quantum registers $|\lambda, i, j\rangle$ corresponding to the block diagonalization of the induced representation of the trivial irrep of $G_0$ to $S_n$.

Runtime: $O(\text{poly}(n, \log \epsilon^{-1}))$.

1. Take an ancilla register B of $\log |G_0|$ qubits initialized to $|0\rangle$.
2. Perform inverse $QFT^{-1}(G_0)$ on B.
3. Perform $GPE_R$ on the register AB where R is the right regular representation of $S_n$.
4. Perform a $QFT(S_n)$ on the registers AB.

Theorem 1. The above process QFTPermMod performs a block diagonalization of the permutation module in time $O(\text{poly}(n, \log \epsilon^{-1}))$.

Proof. The main reason of why GPE is needed is to align part of the multiplicity space to coincide with the trivial action of the group $G_0$. The action of $G_0$ and $S_n$ in the multiplicity space is the so called right regular representation R. This acts on Young tableau according to the Young orthonormal representation since for the right action of $S_n$, the multiplicity space is an irrep. The result of performing GPE on the basis vector ▦ (say) for $G_0 = S_2 \times S_2$ would stabilize it. In other words, swapping 1 and 2 or swapping 3 and 4 does not affect the vector. This would then correspond to the SSYT ▦. Some vectors do not appear in the multiplicity space of the trivial irrep of $G_0$ in GPE. For example, the vector ▦ would be taken to zero by the action of $G_0$.

A more detailed explanation of the steps in the above process include:

1. Start with the basis $|t\rangle$ in register A, where t is an element of the transversal of $G_0$ in $S_n$. Suppose we had the state $\Sigma_t a_t |t\rangle^A$. We take an ancilla register B including $\log |G_0|$ qubits to get $\Sigma_t a_t |t\rangle^A |0\rangle^B$.
2. Perform inverse QFT over $G_0$ on the B register to obtain an equal superposition over group elements of $G_0$. This allows us to view the registers A and B together as the group basis of $S_n$. This step takes $O(\text{polylog}|G_0|)$ time since the QFT over $G_0$ can be done efficiently for Young subgroups (as they are direct products of symmetric groups). We now have the state $\Sigma_{t,h} b'_t |t\rangle^A |h\rangle^B$. Here h runs over all the elements of $G_0$ and $b'_t = a_t/\sqrt{|G_0|}$.
3. Perform GPE, which includes the following steps. This takes $O(\text{polylog}|G_0| + \text{poly}(n))$ time since controlled R operations can be done in poly n time and there are two QFTs over $G_0$.

Take a register C of $\log |G_0|$ qubits initialized to $|0\rangle$ and obtain an equal superposition over $G_0$ in it. This gives us the state $\Sigma_{t,h,g} b_t |t\rangle^A |h\rangle^B |g\rangle^C$, where g also runs over all elements of $G_0$ and $b'_t/\sqrt{|G_0|}$.

Conditioned on the register C, perform a controlled right multiplication on the group basis of $S_n$ in registers AB i.e., perform $\Sigma_{g \in G_0} |g\rangle\langle g|^C \otimes R(g)^{AB}$, where R is the right multiplication in $S_n$. This gives the state $\Sigma_{t,h,g} b_t R(g)^{AB} (|t\rangle^A |h\rangle^B) |g\rangle^C$.

Perform $QFT(G_0)$ on C. This gives us the following state $$\sum_{\mu,k,l,g,h,t} \frac{\sqrt{d_\mu}}{|G_0|} [\mu(g)]_{k,l} b_t R(g)^{AB} |t, h\rangle^{AB} |\mu, k, l\rangle^C, \quad (3.1)$$

Where $\mu$ runs over all the irreps of $G_0$ and k and l run over its dimension.

4. Perform a QFT over $S_n$ on the registers AB. This takes time $O(\text{polylog}|S_n|)$. With this step and the GPE above, the initial state $\Sigma_t a_t |t\rangle^A$ becomes $$\sum_{t,h,g,\lambda,\mu,i,j,k,l} \frac{\sqrt{d_\mu d_\lambda}}{|G_0|n!} [\lambda(th)]_{i,h} \quad (3.2)$$

$$b_t [\mu(g)]_{k,l} (|\lambda\rangle \otimes \lambda(g) |\mu, k', l\rangle \otimes |j\rangle)^{AB} |\mu, k, l\rangle^C,$$

where $\mu$ is an irrep of $G_0$ and k, l run over its dimension. Similarly, $\lambda$ is an irrep of $S_n$ and i,j run over its dimension. The sum over t runs over the transversal and h, g over elements of $G_0$. $[\mu(g)]_{k,l}$ is the k, l matrix element of the irrep $\mu$ evaluated at $g \in G_0$. In the above expression, the term in brackets denoting the AB register has three registers. The first is the irrep label, the second is the multiplicity label (which the GPE procedure acts on) and the third is the irrep register. Using the fact that $\Sigma_{h \in G_0} \lambda(h)$ is just the projector onto the trivial irrep multiplicity of $\lambda$ restricted to $G_0$, we can see that the multiplicity space in the AB register will contain superpositions over vectors that are stabilized by $G_0$.

5. Since we only have states that are stabilized by right multiplication in the multiplicity space, we would end up with a state that has support only over the trivial irrep of the subgroup $G_0$ i.e., $\mu$ is trivial. So we can throw away the registers containing it and we would obtain $|\lambda, i', j\rangle$ with i' now labeling the multiplicity space. This can be identified with semi-standard Young tableau described above of shape $\lambda$, and content T described above.

Figure 2:
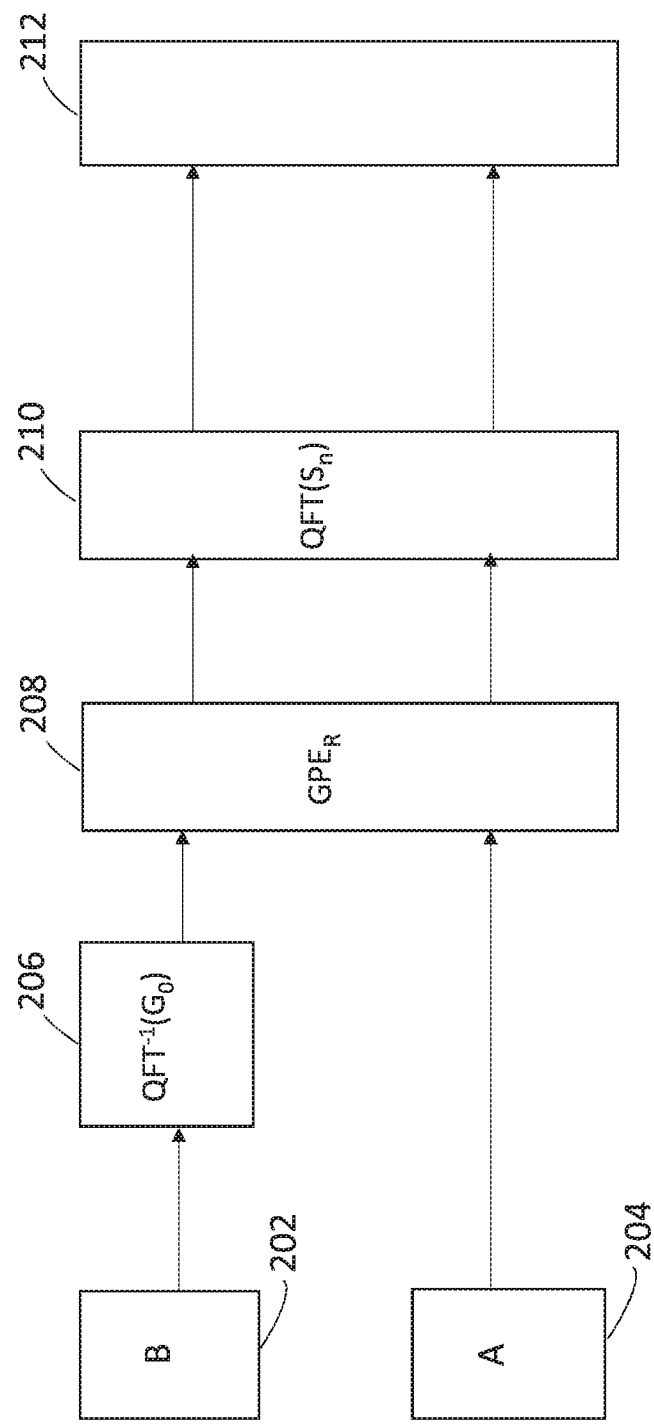
FIG. 2 is an exemplary quantum circuit for performing QFTPermMod($G_0$), according to some embodiments of the present invention.

FIG. 2 is an exemplary quantum circuit for performing QFTPermMod($G_0$), according to some embodiments of the present invention. As shown, quantum register A 204 with the computational basis given by elements of the transversal of $G_0$ in $S_n$, and a quantum register B 202, which is an ancilla register of $\log |G_0|$ qubits initialized to $|0\rangle$, are the input registers to the quantum circuit. The quantum register B 202 is input to a quantum circuit 206 to perform an inverse $QFT^{-1}(G_0)$ on register B. The inverse $QFT^{-1}(G_0)$ of register B and the quantum register A 204 are then input to quantum circuits 208 and 210 for performing $GPE_R$ on the register AB, where R is the right regular representation of $S_n$ and to perform a $QFT(S_n)$ on the registers AB, respectively. The quantum circuits 208 and 210 then generate a $|\lambda, i, j\rangle$ 212 that corresponds to the block diagonalization of the induced representation of the trivial irrep of $G_0$ to $S_n$, for example in three quantum registers at the output.

A process for the high dimensional Schur transform, using the above processes, is now described. This process involves essentially two main steps. The first is a block diagonalization which converts the computational basis into permutation modules and the second is a block diagonalization of each permutation module into the Schur basis. The process is as follows.

DualSchur (n, d, $\in$)

Inputs: A quantum register A with the computational basis given by n-tuples $|e_1, \ldots, e_n\rangle$, where $e_j \in [d]$ Outputs: Quantum registers $|\lambda, i, j\rangle$, where $\lambda$ is the irrep label of the symmetric group, i is the irrep register of the unitary group in the Gelfand-Tsetlin basis and j is the irrep label of the symmetric group in the Young orthonormal basis.

Runtime: $O(\text{poly}(n, \log d, \log \epsilon^{-1}))$.

1. Map the entries of any basis vector that are greater than n to entries inside n and keep track of this mapping. For example, $|e\rangle = |e_1, \ldots, e_n\rangle$ is now $|p_e, \tilde{e}\rangle$, where $\tilde{e}$ is a vector with entries in [n] and $p_e$ is the map.
2. Convert $|\tilde{e}\rangle$ to $|T, t\rangle$, where T is the type and t is the transversal element of the subgroup $G_T$ in $S_n$.
3. Apply QFTPermMod to $|t\rangle$ and obtain the basis $|\lambda, i, j\rangle$.
4. Combine it with the other registers and rewrite this as $|\lambda, (p_e, T, i), j\rangle$.

We have the following theorem.

Theorem 2. Given an n fold tensor product of d dimensional Hilbert spaces and accuracy $\epsilon$, the quantum process of the disclosed dual Schur transform runs in time O(poly log d, n, log $1/\epsilon$) and performs the strong Schur transform i.e., performs the change of basis from the computational basis to the block diagonal basis $|\lambda, i, j\rangle$, where $\lambda$ is the symmetric or unitary group irrep, i labels the GT basis vector in the unitary group irrep and j labels the Young-Yamanouchi basis vector in the symmetric group.

The steps in detail are as follows.
1. Given a basis vector in the computational basis, first we map the entries of the vector that are greater than n to entries inside n and keep track of the map. So a basis vector $|e\rangle = |e_1, \ldots, e_n\rangle$ becomes $|p_e, \tilde{e}\rangle$, where $\tilde{e}$ is a vector with entries in [n] and $p_e$ is the map. This map need not be global and can be specific to the vector $|e\rangle$. This can be done in poly(n) steps. As a running example, let us consider n=5, d=10 and take the vector $|5, 5, 10, 3, 9\rangle$. In the first step, this gets mapped to $|10 \to 1, 9 \to 2\rangle \otimes |5, 5, 1, 3, 2\rangle$. This can be done in O(n log d) steps.
2. Compute the type of the vector $\tilde{e}$ and the symmetric group element (as a product of a set of transpositions) needed to convert the standard basis vector i.e., where the entries appear in ascending order to $\tilde{e}$. The basis vector $|e\rangle$ is converted to $|p_e, T, t\rangle$, where T is the type (described earlier) and t is the transversal element of the subgroup $G_T$ in $S_n$. For the example, we would have the standard basis vector as $|1,1,1,0,2\rangle$ i.e., one 1, one 2, one 3, zero 4, and two 5s. The transversal as a product of transpositions would be (15)(52)(53). This poly(n) time.
3. Recall that the register with $|t\rangle$ can be viewed as the induced representation of $G_T$ in $S_n$. i.e., a permutation module. Conditioned on the type T, we can apply the Fourier transform for permutation modules to obtain the basis $|p_e, T, \lambda, i, j\rangle$. This step takes poly(n, log $\epsilon^{-1}$) time.
4. Rewriting this as $|\lambda, (p_e, T, i), j\rangle$ we can convert $p_e, T, i$ into SSYT by using the information in $p_e$ and T and rewriting the basis i, which includes SSYT of shape $\lambda$ and content T, to match the GT basis.

Figure 3:
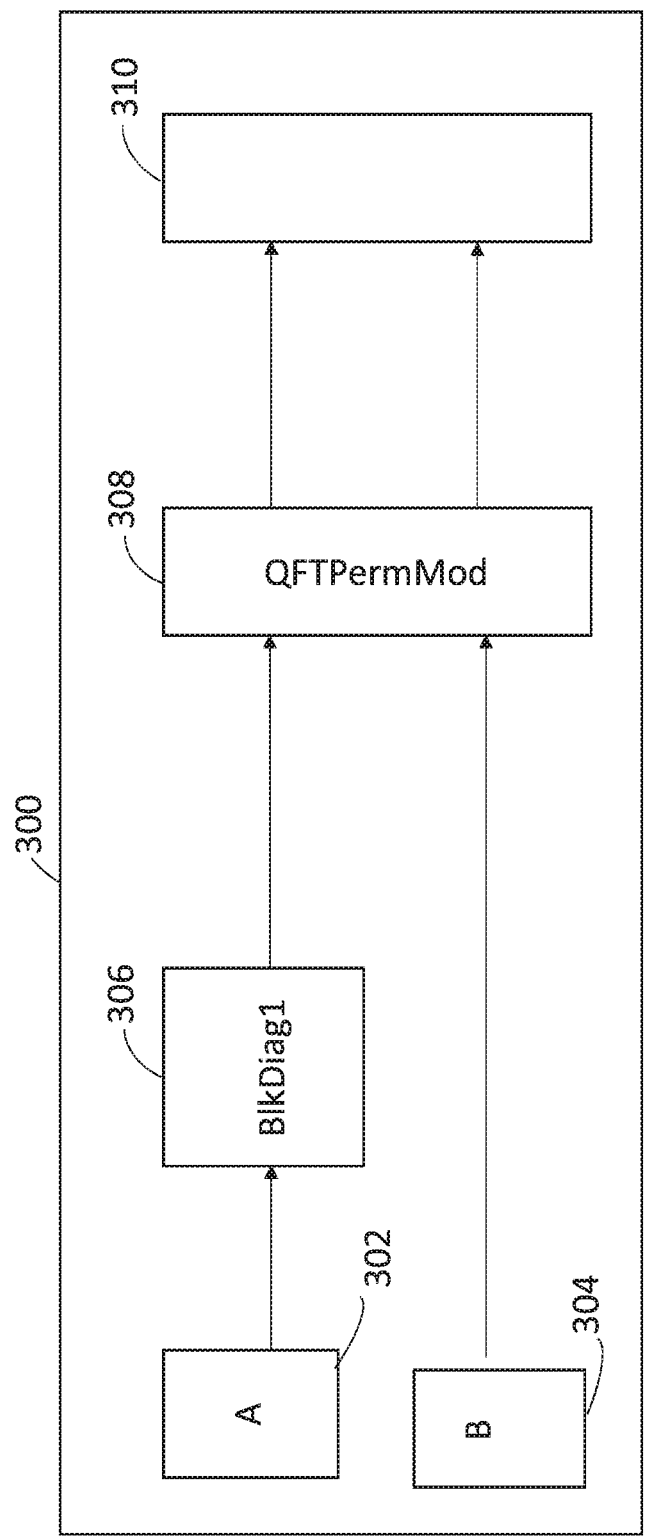
FIG. 3 is an exemplary quantum circuit for performing the Schur transform, according to some embodiments of the present invention.

FIG. 3 is an exemplary quantum circuit for performing the Schur transform, according to some embodiments of the present invention. As shown, two quantum registers, A which contains $|0^n\rangle$ 302 and B, which contains $|0^m\rangle$ 304 are input to the quantum circuit 300, where n is the number of the quantum systems and therefore $|0^n\rangle$ 304 represents n systems initialized to "0" states. "m" is number of quantum systems taken as work space and thus $|0^m\rangle$ 302 represents m systems initialized to the "0" state. In some embodiments, the number "m" is taken to be equal to "n". A quantum circuit 306 performs the first block diagonalization i.e., convert the computational basis to permutation modules. This corresponds to steps 1 and 2 of the Procedure DualS- chur described above. The output of the quantum circuit 306 now includes the states, $g_1, g_2, g_3, \ldots g_N$, which are called the transversal elements. This circuit will block diagonalize the $|0^n\rangle$ 304 into larger blocks, which is then diagonalized to smaller blocks, based on Schur-Weyl method. The quantum circuit 308 is the previously described GPE module. It appends a workspace register to the initial state of $|0^n\rangle$ 304. The outputs of the quantum circuit 308 are registers including basis $|\lambda, i, j\rangle$ that form the Schur basis.

The disclosed invention is an efficient process for a high dimensional Schur transform that runs in time O(poly (n, log d, log $1/\epsilon$)). This results in an exponential improvement in the dimension over the prior works. The disclosed invention uses the representation theory of the symmetric group, rather than that of the unitary group. Moreover, the disclosed invention uses only the quantum Fourier transform and generalized phase estimation (which is also based on the QFT) and therefore no new tool is essentially used. A circuit for a Fourier transform over induced representations is also devised. Several permutation modules, which are induced representations, encode problems that include element distinctness and collision finding. The subroutines to block diagonalize permutation modules could provide Fourier analytic process to these problems and therefore can be generalize to solve other problems, which have permutational symmetry.

It will be recognized by those skilled in the art that various modifications may be made to the illustrated and other embodiments of the invention described above, without departing from the broad inventive step thereof. It will be understood therefore that the invention is not limited to the particular embodiments or arrangements disclosed, but is rather intended to cover any changes, adaptations or modifications which are within the scope of the invention as defined by the appended claims and drawings.

What is claimed is:
1. A quantum circuit for Schur transform comprising:
   a first quantum register including n quantum systems initialized to an initial state of "0", where n is an integer and represents a number of quantum systems;
   a second quantum register including m quantum systems initialized to the initial state of "0", where m is an integer and represents a required workspace;
   a first quantum circuit that operates on only the first register and performs a block diagonalization of the n quantum systems into permutation modules;
   a second quantum circuit that operates on both registers and block diagonalizes each of the permutation modules using a QFTPermMod operation; and
   one or more quantum output registers coupled to the second quantum circuit for holding a basis for the Schur transform.

2. The quantum circuit of claim 1, wherein m is equal to n.

3. The quantum circuit of claim 1, wherein the QFTPermMod operation comprises:
   providing the first quantum register with a computational basis given by elements of the transversal of $G_0$ in $S_n$, where $G_0$ is a Young subgroup, and $S_n$ is a subgroup tower;
   providing the second quantum register as an ancilla register of log $|G_0|$ qubits and is initialized to $|0\rangle$;
   performing an inverse quantum Fourier Transform (QFT$^{-1}(G_0)$) on the second quantum register;

performing a generalized phase estimation ($GPE_R$) on the inverse $QFT^{-1}(G_0)$ of the second quantum register and the first register, where R is the right regular representation of $S_n$; and performing a quantum Fourier Transform ($QFT(S_n)$) on the first and second quantum registers.

4. The quantum circuit of claim 1, wherein the quantum circuit performs the Schur transform using a representation theory of symmetric groups.

5. The quantum circuit of claim 1, wherein the quantum circuit performs the Schur transform using a Schur-Weyl duality.

6. A quantum method for performing Schur transform, the method comprising:

providing a first quantum register including n quantum systems initialized to an initial state of "0", where n is an integer and represents a number of quantum systems;

providing a second quantum register including m quantum systems initialized to the initial state of "0", where m is an integer and represents a required workspace;

performing a block diagonalization on the first register into permutation modules;

performing block diagonalizing on each of the permutation modules and the second quantum register, using a QFTPermMod operation; and holding outputs of the block diagonalization of each of the permutation modules as a basis for the Schur transform.

7. The quantum method of claim 6, wherein m is equal to n.

8. The quantum method of claim 6, wherein the QFT-PermMod operation comprises:

providing the first quantum register with a computational basis given by elements of the transversal of $G_0$ in $S_n$, where $G_0$ is a Young subgroup, and $S_n$ is a subgroup tower;

providing the second quantum register as an ancilla register of log $|G_0|$ qubits and is initialized to $|0>$;

performing an inverse quantum Fourier Transform ($QFT^{-1}(G_0)$) on the second quantum register;

performing a generalized phase estimation ($GPE_R$) on the inverse $QFT^{-1}(G_0)$ of the second quantum register and the first register, where R is the right regular representation of $S_n$; and performing a quantum Fourier Transform ($QFT(S_n)$) on the first and second quantum registers.

9. The quantum method of claim 6, wherein the quantum method performs the Schur transform using a representation theory of symmetric groups.

10. The quantum method of claim 6, wherein the quantum method performs the Schur transform using a Schur-Weyl duality.

* * * * *